United States Patent [19]
Evertz

[11] Patent Number: 4,982,774
[45] Date of Patent: Jan. 8, 1991

[54] TREAD PROFILE FOR A PNEUMATIC VEHICLE TIRE

[75] Inventor: Karlheinz Evertz, Herzogenrath-Kohlscheid, Fed. Rep. of Germany

[73] Assignee: Continental Aktiengesellschaft, Hanover, Fed. Rep. of Germany

[21] Appl. No.: 369,774

[22] Filed: Jun. 22, 1989

[30] Foreign Application Priority Data

Jun. 22, 1988 [DE] Fed. Rep. of Germany ... 8807996[U]

[51] Int. Cl.$^5$ ...................... B60C 11/06; B60C 11/12
[52] U.S. Cl. .............................. 152/209 R; D12/145
[58] Field of Search .................. 156/209 R; D12/142, D12/145

[56] References Cited

U.S. PATENT DOCUMENTS

| D. 228,423 | 9/1973 | Blankenship | D12/142 |
| D. 290,243 | 6/1987 | Ghilardi | D12/142 |
| 4,705,088 | 11/1987 | Ghilardi | 152/209 R |
| 4,926,919 | 5/1990 | Hopkins et al. | 152/209 R |

FOREIGN PATENT DOCUMENTS 3445041 6/1986 Fed. Rep. of Germany ... 156/209 R

Primary Examiner—Michael W. Ball
Assistant Examiner—Mark A. Osele
Attorney, Agent, or Firm—Robert W. Becker & Associates

[57] ABSTRACT

A pneumatic vehicle tire having a tread profile comprised of several axially adjacent, circumferentially extending profiled ribs separated from one another by circumferentially extending grooves and provided with fine slits that extend at an angle to the circumferential direction. Rune-shaped profiled rib segments are formed by stepped fine slits and are disposed such that: a profiled rib in the center of the tread, and profiled shoulder ribs, comprise first profiled rib segments having a first lug-shaped segment portion that extends beyond first side edges of these ribs that extend parallel to the circumferential direction, and also comprise second profiled rib segments having a second lug-shaped segment portion that extends beyond second side edges of these ribs that also extend parallel to the circumferential direction, with the first and second rib segments of a given rib being disposed adjacent one another, having essentially identical contours, and being turned by 180° relative to one another; respective profiled ribs disposed between the central rib and the shoulder ribs comprise third profiled rib segments having a third lug-shaped segment portion, and also comprise a stepped fourth profiled rib segment, with the third and fourth rib segments of one of these ribs having essentially the same contour as, and being turned by 180° relative to, the third and fourth rib segments of the other of these ribs; and all of the segment portions, which project laterally into respective circumferential grooves, are disposed across from correspondingly shaped recesses in adjacent profiled ribs.

6 Claims, 1 Drawing Sheet

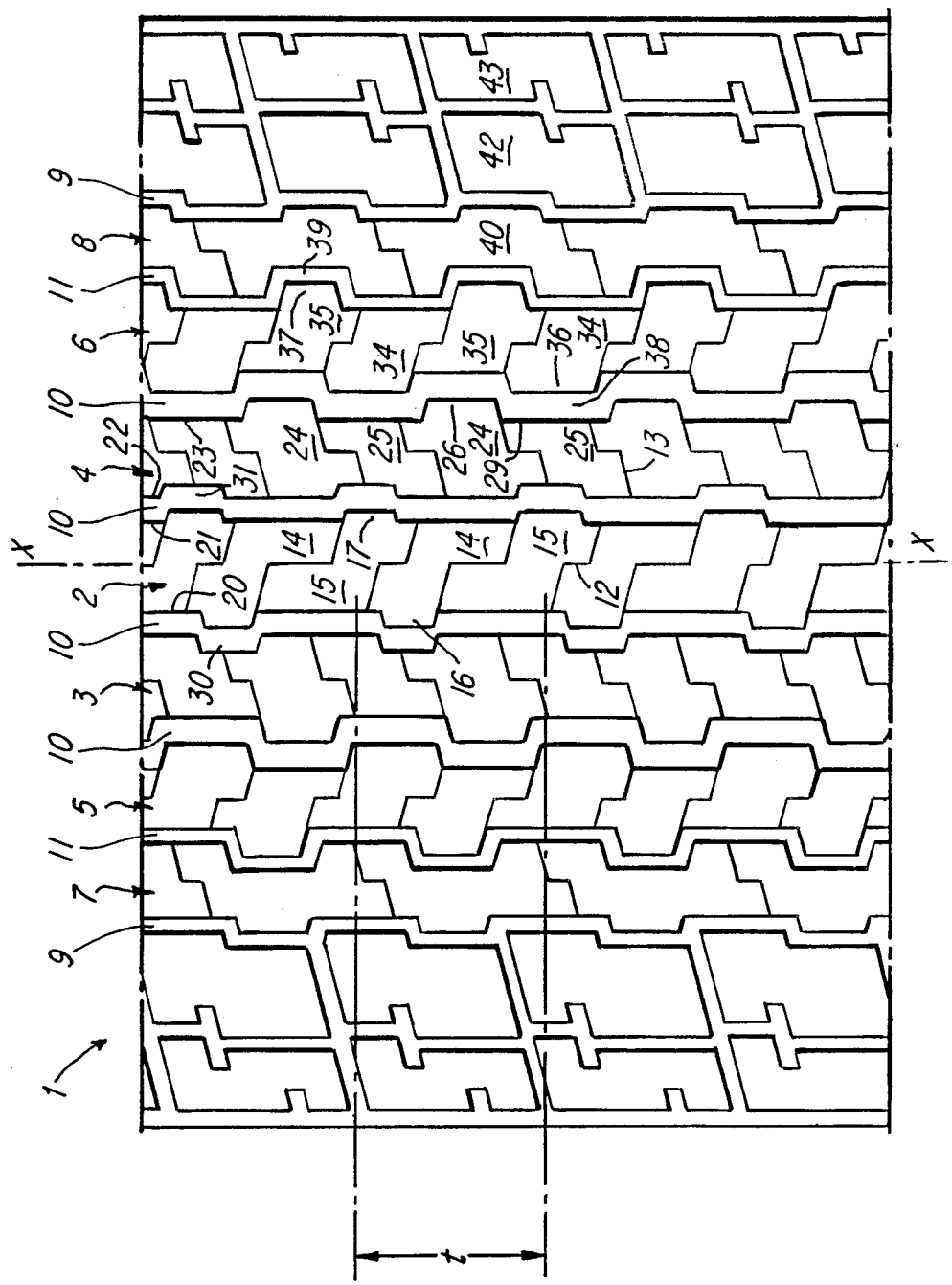

TREAD PROFILE FOR A PNEUMATIC VEHICLE TIRE

BACKGROUND OF THE INVENTION

The present invention relates to a pneumatic vehicle tire of radial carcass construction with a belt-like reinforcement of a profiled tread strip, whereby the tread profile is comprised of several axially adjacent, circumferentially extending profiled ribs that are separated from one another by circumferentially extending grooves and that are provided with sipes or fine slits that extend at an angle to the circumferential direction of the tire.

It is an object of the present invention to improve the resistance to wet sliding, traction, uniform wear, and quiet running properties of profiled ribs of the tread profile of pneumatic vehicle tires of the aforementioned general type.

BRIEF DESCRIPTION OF THE DRAWING

This object, and other objects and advantages of the present invention, will appear more clearly from the following specification in conjunction with the accompanying schematic drawing, which shows part of one exemplary embodiment of the inventive tread profile of a pneumatic vehicle tire.

SUMMARY OF THE INVENTION

The tread profile of the present invention is characterized primarily in that the profiled rib segments that are formed by stepped fine slits have a rune-shaped support surface and are disposed in the circumferential direction in such a way that the lug-shaped segment portions thereof alternately project to the right and to the left into the essentially linear circumferential grooves, with each projecting segment portion being disposed across from a recess.

Provided is a fine-segmented profile that is formed by sixty-four circumferential sections with pronounced transverse slits. Seven circumferential ribs are preferably provided that have a surface component that is essentially identical to the negative component of the grooves. By providing transverse slits, the resistance to sliding when the pavement is wet is improved, in which connection the inclined orientation of the fine slits alternates in direction from one rib to the next.

As a result of the lug-shaped projection of the rib segments, the ribs and grooves have a staggered arrangement that assures good traction. The shape of the rib segments, and their segmented arrangement resulting from the fine slits, results in circumferential ribs that assure uniform wear and low tire noise.

Further specific features of the present invention will be described in detail subsequently.

DESCRIPTION OF PREFERRED EMBODIMENTS

Referring now to the drawing in detail, shown is the tread profile 1 of a pneumatic vehicle tire. This profile comprises: a circumferential rib 2 that is disposed in the center of the tread; the circumferential ribs 4 and 3, which are disposed adjacent to the circumferential rib 2 and are separated therefrom by a respective circumferential groove 10; and the circumferential ribs 5 and 6, which are disposed in the tire shoulders, are separated from the ribs 3, 4 by respective circumferential grooves 10, and are separated by a respective circumferential groove 11 from the circumferential ribs 7 and 8 that merge into the tire shoulders.

The profiled ribs essentially comprise rune-shaped rib segments that are formed by the stepped sipes or fine slits 12, 13. Two rib segments 14, 15 are provided in the central rib 2. The rune-shaped support surface is periodically enlarged by lug-shaped segment portions 16, 17. The rib segments are disposed next to one another in the circumferential direction x—x, with each rib segment being turned by 180° from its neighbor such that the segments rest against one another, thereby forming a rib having an alternately right and left staggered arrangement.

The side edges of the ribs are designated by the reference numerals 20 and 21 and extend parallel to the circumferential direction. Sixty-four sections "t" are provided in the circumferential direction.

The circumferential ribs 3, 4 are comprised of rib segments 24, 25. The rune-shaped support surface thereof is enlarged by respective lug-shaped segment portions 26 that are provided on respective ones of said rib segments 24. Disposed adjacent the rib segments 24 with their segment portions 26 are rib segments 25 that extend in and transverse to the circumferential direction. The rib segments 25 of the circumferential rib 3 are turned by 180° from the rib segments 25 of the circumferential rib 4.

The side edges 22, 23 of the ribs extend parallel to the circumferential direction, and the side edges 29 of the rib segments 25 also extend parallel to the circumferential direction.

As a consequence of the rib segments, which are formed by the pronounced transverse orientation of the fine slits 12, 13 that are disposed at the same inclination yet in opposite directions, the circumferential ribs 2 and 3, 4 are disposed in such a way that each lug-shaped segment portion 16, 17 is disposed across from a recessed or cutaway portion of the adjacent rib; these cutaway portions are designated by the reference numerals 30, 31.

The circumferential ribs 5, 6 are comprised of the rib segments 34, 35. The rune-shaped support surface thereof is periodically enlarged by lug-shaped segment portions 36, 37. Disposed opposite each one of these segment portions 36, 37 on the adjacent rib is a recessed or cutaway portion 38, 39.

Due to the fact that they are disposed in the tire shoulder, the outer ribs 7, 8 are segmented less frequently by fine slits. In principle, the same pattern is formed as is the case with the remaining rib segments, with the rib segments 40 of the ribs 7, 8 complementing the grooves 11 that separate these ribs from the ribs 5 and 6.

The decorative elements 42, 43 are separated from the rib profile of the shoulder ribs 7, 8 by a groove 9.

The present invention is, of course, in no way restricted to the specific disclosure of the specification and drawing, but also encompasses any modifications within the scope of the appended claims.

What I claim is:

1. In a pneumatic vehicle tire of radial carcass construction with a belt-like reinforcement of a profiled tread strip, whereby the tread profile is comprised of several axially adjacent, circumferentially extending profiled ribs that are separated from one another by circumferentially extending grooves and that are provided with fine slits that extend at an angle to the circumferential direction of said tire, the improvement wherein:

rune-shaped profiled rib segments are formed by fine slits that are stepped, with said rib segments being disposed in such a way that:

a profiled rib disposed in a central portion of said tread profile, and respective profiled ribs disposed in respective shoulder portions of said tire, each comprise first profiled rune-shaped rib segments that have a first lug-shaped segment portion that extends beyond first side edges of these ribs that extend parallel to said circumferential direction, and also comprise second rune-shaped profiled rib segments that have a second lug-shaped segment portion that extends beyond second side edges of these ribs that also extend parallel to said circumferential direction, with said first and second rune-shaped profiled rib segments of a given one of these ribs being disposed adjacent one another, having essentially identical contours, and being turned by 180° relative to one another;

respective profiled ribs disposed between said central rib and said shoulder ribs each comprise third rune-shaped profiled rib segments that have a third lug-shaped segment portion that extends beyond third side edges of these ribs that extend parallel to said circumferential direction, and also comprise a stepped fourth rune-shaped profiled rib segment that has fourth side edges that extend parallel to said circumferential direction, with said third and fourth profiled rib segments of one of these ribs disposed between said central rib and one of said shoulder ribs, and said third and fourth profiled rib segments of the other of these ribs disposed between said central rib and the other of said shoulder ribs, having essentially identical contours respectively, and being turned by 180° relative to one another and with said third and fourth rune-shaped profiled rib segments being disposed adjacent one another; and all of said lug-shaped segment portions, which project laterally into said circumferentially extending grooves, are disposed across from correspondingly shaped recess means in adjacent ones of said profiled ribs.

2. A tire and tread profile according to claim 1, in which said first and second lug-shaped segment portions of successive profiled rune-shaped rib segments of a given one of said central and shoulder ribs face in opposite directions.

3. A tire and tread profile according to claim 2, in which said third lug-shaped segment portions of said third profiled rune-shaped rib segments of said ribs disposed between said central rib and said shoulder ribs face away from said central rib and toward said shoulder ribs.

4. A tire and tread profile according to claim 1, in which, in a given one of said central, shoulder, and intermediate ribs, said profiled rune-shaped rib segments are grouped repeating in circumferential sections, with each of these ribs having sixty-four such circumferential sections.

5. A tire and tread profile according to claim 4, which includes a total of seven profiled ribs.

6. A tire and tread profile according to claim 5, in which said fine slits in said central and shoulder ribs, when viewed in plan, rise from right to left, and said fine slits of the remainder of said ribs rise from left to right.

* * * * *